(12) United States Patent
Fleming

(10) Patent No.: US 7,387,182 B2
(45) Date of Patent: Jun. 17, 2008

(54) TURBINE GENERATOR REGENERATIVE BRAKING SYSTEM

(76) Inventor: Patrick Fleming, 1355 Washam, Eagle, ID (US) 83616

( * ) Notice: Subject to any disclaimer, the term of this patent is extended or adjusted under 35 U.S.C. 154(b) by 373 days.

(21) Appl. No.: 11/286,705

(22) Filed: Nov. 22, 2005

(65) Prior Publication Data

US 2006/0137927 A1 Jun. 29, 2006

Related U.S. Application Data

(63) Continuation-in-part of application No. 10/885,991, filed on Jul. 6, 2004, now Pat. No. 6,966,394, which is a continuation of application No. 10/119,531, filed on Apr. 8, 2002, now Pat. No. 6,758,295.

(51) Int. Cl.
*B60K 8/00* (2006.01)

(52) U.S. Cl. ............... 180/165; 180/65.3; 303/152; 60/414

(58) Field of Classification Search ............... 180/165, 180/2.1, 2.2, 65.1, 65.2, 65.3; 303/152, 10; 60/413, 414, 330, 333, 668, 698, 417
See application file for complete search history.

(56) References Cited

U.S. PATENT DOCUMENTS

| | | | | |
|---|---|---|---|---|
| 3,665,788 A | 5/1972 | Nyman | ............... | 475/72 |
| 3,910,043 A | 10/1975 | Clerk | ............... | 60/413 |
| 4,098,144 A | 7/1978 | Besel et al. | ............... | 74/687 |
| 4,114,734 A | 9/1978 | Bultmann | ............... | 188/274 |
| 4,270,806 A | 6/1981 | Venkaperumal et al. | ..... | 303/3 |
| 4,282,948 A | 8/1981 | Jerome | ............... | 180/165 |
| 4,342,371 A | 8/1982 | Smitley | ............... | 180/165 |
| 4,413,698 A | 11/1983 | Conrad et al. | ............... | 180/305 |
| 4,414,805 A | 11/1983 | Walker | ............... | 60/39.161 |
| 4,479,356 A | 10/1984 | Gill | ............... | 60/699 |
| 4,592,454 A | 6/1986 | Michel | ............... | 192/3.23 |
| 4,753,078 A | 6/1988 | Gardner, Jr. | ............... | 60/668 |
| 4,760,697 A | 8/1988 | Heggie et al. | ............... | 60/408 |
| 4,798,053 A | 1/1989 | Chang | ............... | 60/712 |
| 5,400,596 A | 3/1995 | Shlien | ............... | 60/597 |

(Continued)

*Primary Examiner*—Christopher P. Ellis
*Assistant Examiner*—Brian L. Swenson
(74) *Attorney, Agent, or Firm*—Pedersen & Co., PLLC; Ken J. Pedersen; Barbara S. Pedersen

(57) ABSTRACT

A turbine generator regenerative braking system may be used to slow or stop a rotating shaft or wheel, wherein energy may be recovered as electricity generated by a turbine generator and stored in batteries, ultra-capacitors, or other storage systems. The turbine generator may be fluid-jet powered, the fluid-jet being provided by at least one hydraulic fluid pump linked to the rotating shaft or wheel. A braking actuation system operatively connects/starts the pumping action, and controls may be provided to adjust the flowrate through the fluid-jet nozzle. In some versions of the system, a hydraulic pump, a clutch, and an adjustable-flow nozzle will be dedicated to each ground engaging wheel of the vehicle. In a vehicle, braking is preferably initiated by the driver by actuation of a brake master cylinder that provides hydraulic pressure to cause each hydraulic pump to engage with its corresponding pump. The pressurized fluid output of each pump is then fed to the turbine through the adjustable-flow nozzle. Energy recovery may be optimized by adjusting the direction of the nozzle spray or the location of the nozzle, and/or by providing a multi-stage turbine.

19 Claims, 11 Drawing Sheets

U.S. PATENT DOCUMENTS

| | | | |
|---|---|---|---|
| 5,505,527 A | 4/1996 | Gray, Jr. et al. | 303/3 |
| 5,923,093 A | 7/1999 | Tabata et al. | 290/40 C |
| 5,931,249 A | 8/1999 | Ellis et al. | 180/165 |
| 5,971,092 A | 10/1999 | Walker | 180/308 |
| 6,068,351 A | 5/2000 | Martin-Gerez | 303/10 |
| 6,113,197 A | 9/2000 | Kuroki et al. | 303/11 |
| 6,170,587 B1 | 1/2001 | Bullock | 180/69.6 |
| 6,332,257 B1 | 12/2001 | Reed, Jr. et al. | 29/401.1 |
| 6,454,033 B1 | 9/2002 | Nathan et al. | 180/65.1 |
| 6,460,332 B1 | 10/2002 | Maruta et al. | 60/414 |
| 6,719,080 B1 | 4/2004 | Gray, Jr. | 180/165 |

TURBINE GENERATOR REGENERATIVE BRAKING SYSTEM

This application is a continuation-in-part application of, and claims priority of, U.S. patent application Ser. No. 10/885,991, filed Jul. 6, 2004, entitled "Turbine Generator Regenerative Braking System, and issued as U.S. Pat. No. 6,966,394 on Nov. 22, 2005, which is a continuation of, and claims priority of, U.S. patent application Ser. No. 10/119,531, filed Apr. 8, 2002, also entitled "Turbine Generator Regenerative Braking System", issuing as U.S. Pat. No. 6,758,295 on Jul. 6, 2004, the disclosures of which are incorporated herein by this reference.

BACKGROUND OF THE INVENTION

1. Field of the Invention

This invention relates, in general, to braking systems, and, more particularly, to regenerative braking systems for vehicles. This invention relates to a regenerative braking system that slows a vehicle by operatively connecting a hydraulic pump system to the vehicle's rotating wheels to pump fluid to a turbine for electric generation.

2. Related Art

The prior art is replete with approaches to extracting, storing and beneficially using the energy usually dissipated during vehicle braking. These approaches in part include many combinations and interconnections of flywheels, hydraulic and pneumatic accumulators, motors, pumps, and the like. None of the known prior art, however, incorporates a turbine generator for regenerative braking and electrical energy generation, as in the present invention. The following brief review of some of the prior art will be useful in establishing the novelty and utility of the present invention.

Bultmann (U.S. Pat. No. 4,114,734) has disclosed a braking system having a hydrodynamic coupling driven by the vehicle, wherein the operating fluid is conducted into an external circulatory system by way of a cooler or radiator. This hydrodynamic coupling also serves as a feed pump for the operating fluid and is operatively connected with a turbine to drive a separate cooling fan. In this manner, heat removal from the braking system may be facilitated.

Jerome (U.S. Pat. No. 4,282,948) discloses a motor vehicle propulsion system including a liquid-filled flywheel to store kinetic energy. When motor vehicle acceleration is desired, the flywheel liquid is coupled to a turbine which is connected through a drive train to drive the rear wheels.

Smitley (U.S. Pat. No. 4,342,371) also teaches a flywheel approach to storing and supplying energy for vehicles. The flywheel is selectively connected to the power train of a vehicle and absorbs energy from the vehicle's ground engaging wheels during the deceleration of the vehicle. This process provides at least a degree of vehicular braking. A clutch is also provided to selectively engage/disengage the flywheel connection to the wheels.

Chang (U.S. Pat. No. 4,798,053) employs a vehicle's engine to compress air when the vehicle decelerates and reuses the air thus-compressed to drive an air motor which assists in moving the vehicle when it is underway again.

Gray et al. (U.S. Pat. No. 5,505,527) provides a vehicular power train with regenerative braking having a pump/motor combination connected to the vehicle's drive wheels. In the vehicle's braking mode, the pump comes into play and charges an accumulator. When it is desired to accelerate the vehicle, the accumulator releases its stored energy by providing hydraulic power to the motor which, in turn, drives the vehicle's wheels. Controls and switches are provided to implement and coordinate the various functions of the components.

Ellis et al. (U.S. Pat. No. 5,931,249) disclose a kinetic energy storage system that uses a flywheel with a motor generator to store energy. The flywheel rotates at a high speed in a vacuum. The flywheel may also be used to power the vehicle.

Martin-Gerez (U.S. Pat. No. 6,068,351) teaches an axle-driven pumping mechanism used to pressurize a volume of hydraulic fluid in response to a braking command. The fluid thus-pressurized activates a turbine that is used to drive a cooling fan directed at a radiator used to dissipate heat in the hydraulic fluid.

Gardner, Jr. (U.S. Pat. No. 4,753,078) discloses an electro hydraulic vehicle drive system, and Bullock (U.S. Pat. No. 6,170,587) discloses a hybrid propulsion system for road vehicles.

Thus it is a primary objective of this invention to provide a braking system that generates electrical energy while facilitating braking of the vehicle. It is another object of this invention to include a turbine generator in such a system that is powered by a fluid-jet driven by the vehicle's wheels. It is a further object of this invention to store the generated electrical energy for the later use by the vehicle. Another object of this invention is to provide a turbine generator regenerative braking system that is applicable to any apparatus requiring braking independent of the primary motive power.

SUMMARY OF THE INVENTION

The present invention is a turbine generator regenerative braking system for slowing and/or stopping a device requiring braking which may be adapted for energy conservation off a rotating shaft. In many embodiments, the braking system is applied to a vehicle having ground-engaging wheels and an electrical energy storage device.

The braking system comprises an hydraulic fluid turbine generator having an electrical power output connected to the electrical energy storage device, one or more hydraulic fluid pumps, and an hydraulic fluid circuit operatively and cooperatively connecting the hydraulic pump(s) to the turbine generator. Further, the braking system comprises an actuator system adapted to operatively connect the fluid pump(s) to the wheel(s), to actuate pump operation powered by the wheel(s) for pumping fluid through the hydraulic fluid circuit. An operator's foot pedal or other operator control means is adapted to signal the actuator system, preferably controlling application of the brakes in an incremental manner. Preferably, the hydraulic fluid circuit comprises outlet nozzles through which the hydraulic fluid is forced to jet against cups/blades of the turbine, for recovery of energy from the fluid circuit outlet nozzle spray/jets by generation of electricity.

By slowing the vehicle, via a method that comprises operative connection of the wheels/axles to fluid pumps that power a turbine, the invented system transfers/recovers some of the vehicle kinetic energy into/as electrical energy rather than dissipating the energy as heat during conventional frictional slowing by brake shoes. The system preferably has adjustment features for controlling/varying the amount of braking, so that the braking system may be used during travel for slowing or for slowing and stopping. Adjustment features preferably comprise the jet nozzles being adjustable to vary flow restriction in the hydraulic line(s). Further, another adjustment feature may comprise a variable pump rate such as with a variable positive-displacement pump. Many embodiments of the invented turbine generator regenerative braking system are applicable to vehicles powered by internal combustion engines, pure electrical vehicles and hybrid vehicles. In fact, the inventor believes this invention has universal applicability to any device requiring a means for braking which may be adapted for energy conservation off the rotating shaft.

These and many other features and attendant advantages of the invention will become apparent, as the invention becomes better understood by reference to the following detailed descriptions and accompanying drawings.

DETAILED DESCRIPTION OF THE INVENTION

Figure 1:
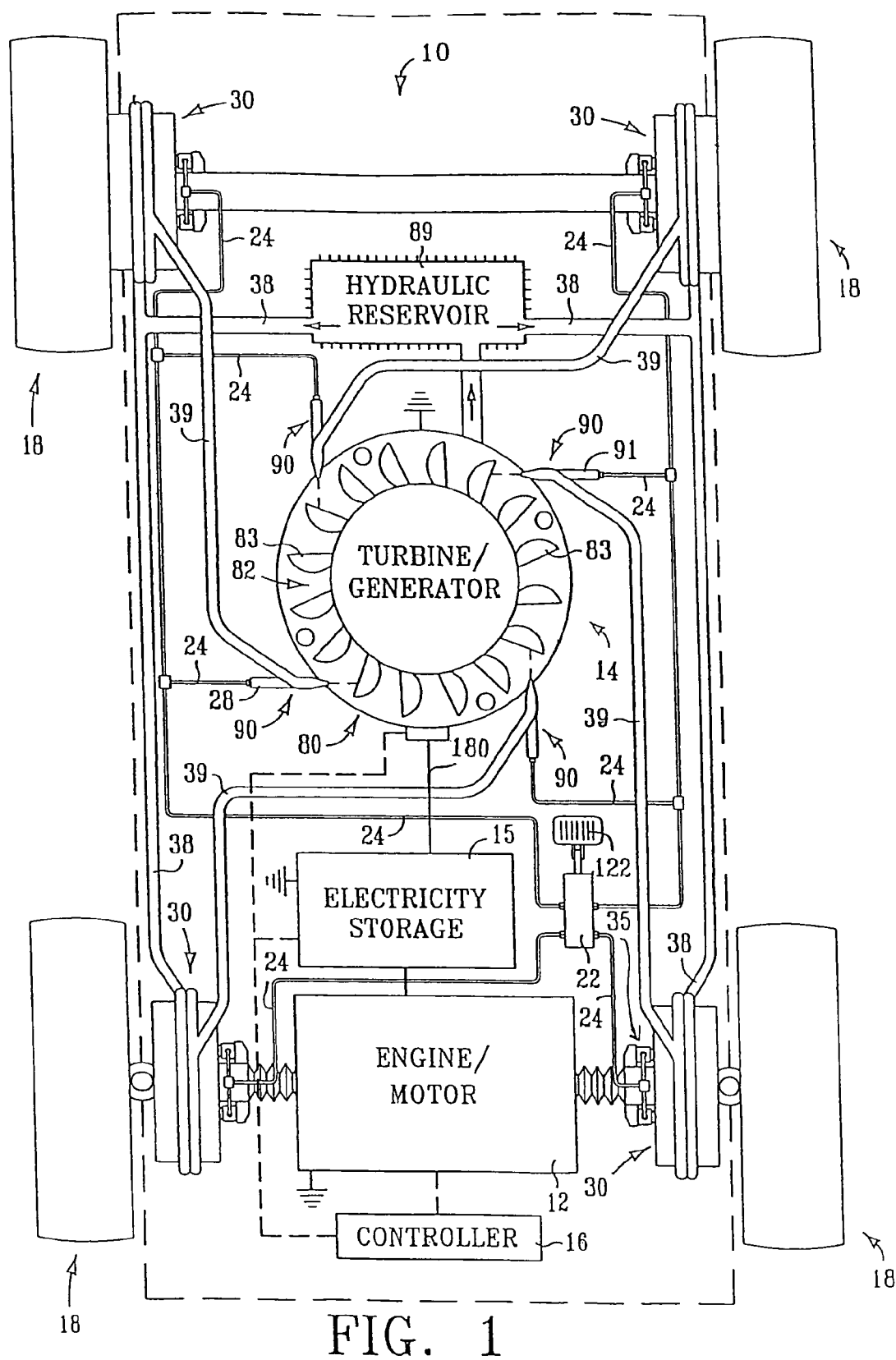
FIG. 1 is a schematic plan view of one embodiment of the invention as applied to a four-wheeled vehicle.

Referring to the Figures, there are shown several, but not the only, embodiment of the invented turbine generator regenerative braking system. The preferred embodiments, shown in the Figures and described below, relate to vehicular braking, but many features disclosed herein are applicable to braking of any rotating shaft. In summary, energy is transferred from wheel/axle to pump(s), to fluid, to turbine, to generator, to electrical storage and/or use. Adjustable nozzle(s) are used to restrict flow and control pressure in the fluid lines from the pumps to the nozzle(s), and, hence, to affect the workload placed on the pump(s).

In most embodiments of this invention that are applied to vehicles, each wheel may power, and, hence, may be slowed by, the fluid-jet-turbine system. Each wheel may be operatively connected/connectable to its own respective fluid hydraulic pump and its own respective fluid line and nozzle, so that a pump and nozzle system is connected to and dedicated to each of the plurality of wheels.

The preferred actuation system comprises a mechanism for starting and stopping pump operation in response to whether and how much the operator is applying the brakes. The actuation system comprises operative connection of the rotating wheel(s) to the pump(s), which may be accomplished in various ways comprising mechanical connection/coupling of a pump that automatically pumps when connected, start-up of the pump separate from mechanical connection, or start-up or speeding-up of a pump that is already connected to the wheel. For example, the pump device may be mechanically engaged with the wheel at all times, but with the pump adapted to not pump fluid until braking is actuated by the operator. Such a system, for example, could comprise a variable-positive-displacement pump that is adapted to be at a zero pumping rate during normal non-braking operation but that increases to a non-zero pumping rate when the brake is actuated. In such a case, actuation of the pump would not necessarily affect physical connection of the pump to the wheel by a clutch, but actuation would comprise startup of the already-connected pump and/or increasing of the pumping rate to the desired level. Alternatively, the pump may be disengaged mechanically from the wheel until braking is actuated, at which time a clutch or other coupling mechanism mechanically connects the pump to the wheel and actuates pumping of fluid. As will be understand by one of skill in the art, operative connection to the wheel may include connection to an axle or other part rotating with the wheel.

The actuation system may comprise various types of actuation, for example, mechanical, hydraulic, air, electrical switching, or other mechanism for causing/allowing the engagement/coupling of the pump to the wheel and/or starting up or increasing the speed or displacement volume of the pump. The actuation is controlled by the operator of the vehicle, and preferred mechanism is a hydraulic master cylinder powered by the driver pressing on a foot pedal in the vehicle cab, and conduits conveying hydraulic fluid to (and hence operating) the preferred clutch system, pump start-up system, or variable rate/displacement mechanism adjustment system. After actuation, the pump is fed by a hydraulic reservoir and powered by the vehicle wheel(s) to force fluid flow through the hydraulic line downstream of each pump to its corresponding adjustable-flow nozzle for delivering/spraying hydraulic fluid against the turbine's blades/cups. The fluid flow from each nozzle impinges on the preferred cup blades, causing the turbine flywheel to rotate, and thus the generator, to rotate. The rotation of the turbine generator thus generates electrical power which is transmitted to the vehicle's electrical energy storage device.

In effect, therefore, this extraction of power from the wheels, to pump fluid through the conduits and through the nozzles, initiates the braking action on each of the wheels. Further braking action may be achieved by a closing movement of needle valves within the nozzles, which provides an increased restriction to fluid flow. This closing movement is preferably controlled by the operator's action in the vehicle cab, that is, preferably pushing harder on the brake pedal. The fluid dynamics affected by closing of the nozzles may include increased pressure/head in the output circuit of each pump, reduced fluid flow rate, reduced pump speed, via this additional work load on the pump and, therefore, on the wheel(s).

The nozzle(s) may be adapted to be completely or substantially completely closed, wherein the hydraulic system will "lock up," so that fluid flow and pumping stops, and, hence, wheel rotation also stops. Such a "lock up" system may adapt the invented braking system to synergistically serve as a parking brake system for the vehicle.

After reviewing this Description and Drawings, one of skill in the art will understand that an actuation system may be designed to operatively couple a rotating wheel/axle of the vehicle to a pump by a clutch system, or to start-up/speed-up a pump already mechanically connected to the wheel/axle of the vehicle, depending on the type of pump chosen. Various types of liquid pumps adapted or adaptable to be powered by rotational movement are known and may be installed in embodiments of the invention.

Heat may need to be removed from the pump circuit, for example, due to energy being dissipated at the site of the restricted nozzle(s) during nozzle(s) operation. Conventional heat transfer, including cooling fins or fan-assisted heat exchange with air, may be provided.

Preferably, the turbine generator continues to rotate and generate electrical power for a period of time after the flow of hydraulic fluid is removed from the cup blades of the turbine. In this fashion, nearly all of the kinetic energy stored in the rotating components of the turbine generator is recovered for use by the vehicle.

Referring Specifically to the Figures

With reference to FIG. 1, the turbine generator regenerative braking system 10 for an automotive vehicle having ground engaging wheels 18 and electrical energy storage device 15, comprises hydraulic fluid turbine generator 80 having an electrical power output 180 connected to the electrical energy storage device 15, a plurality of hydraulic fluid pumps 30 (one each at the wheels 18), an hydraulic fluid circuit operatively and cooperatively connecting the hydraulic pumps to the turbine generator, and an actuation system(s) 35 for causing the pump to be operative engaged with the wheel or to otherwise begin pumping at an appropriate flow-rate or flow-rates to slow the wheel. As discussed in the Summary, the actuation system may comprise, for example, a clutch assembly, a positive-displacement-variation system for a positive displacement pump, or other system operatively connected between the wheels of the vehicle and the hydraulic fluid pump to engage/start-up/increase pumping when the driver/operator brakes the vehicle. In some embodiments, pumps 30 have a fixed displacement with a clutch, however, some embodiments incorporate variable displacement pumps without a clutch.

In FIG. 1, each actuation system 35 is shown as powered by a hydraulic line 24 from a hydraulic master cylinder 22 operated by the vehicle cab brake foot pedal 122. The actuation may be an on-off system, for example, wherein pressing on the pedal engages the clutch and harder pressing on the pedal then further applies the brakes by adjusting the needle valves in the nozzles for increased braking (discussed below). Or, the actuation may be an adjustable system, for example, wherein pressing on the pedal "starts up" the pump at a nominal rate or volume and further pressing on the pedal increases the rate or volume for increased braking.

Figure 2:
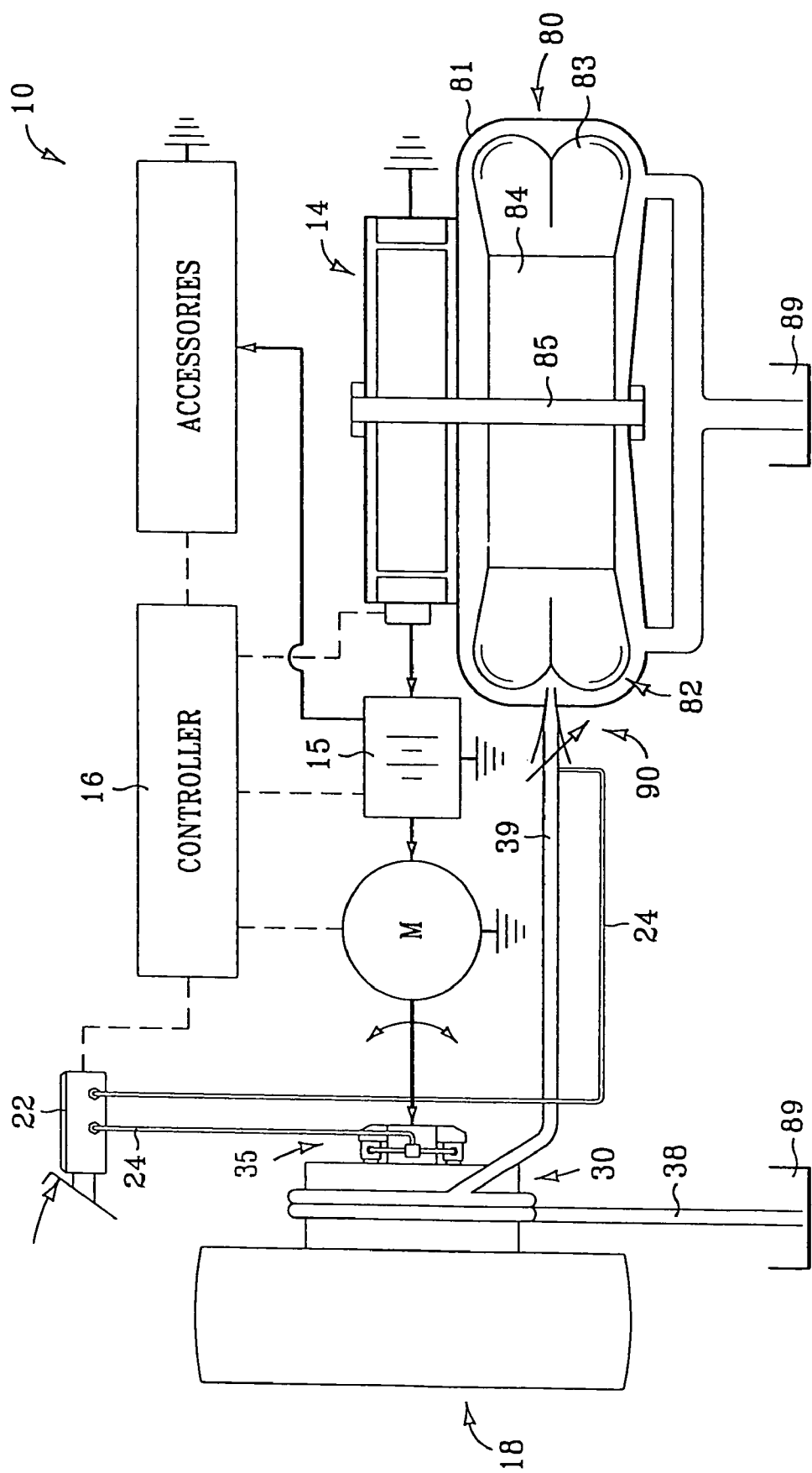
FIG. 2 is a schematic elevation view of one embodiment of the invention showing key components of the turbine generator, pumps and nozzles.

Referring now to FIGS. 1 and 2, the turbine generator further includes generator section 14, casing 81, turbine shaft 85, flywheel portion 84 and runner portion 82 with a plurality of cup blades 83 like a Pelton wheel, fan-like blades, or other structure on which the fluid jets impinge. As discussed below, the turbine may be a multi-stage turbine preferably with moveable and/or multiple jet nozzles. Optionally, power-take-off (PTO) may be provided mechanically from the flywheel shaft.

The runner may have a FIGS. 1 and 2 also show hydraulic fluid reservoir 89, which serves as the feed reservoir for supplying the pumps 30 and receiving circulated fluid exiting the turbine, interconnecting hydraulic lines 38 from the reservoir to the pumps, and lines 39 from the pumps to the adjustable nozzles 90, from which the fluid sprays/jets against the turbine. Brake master cylinder 22, adjustable nozzles 90 and interconnecting hydraulic fluid conduits 24, 38, 39.

In FIGS. 1 and 2, there are shown arrangements of hydraulic lines 24 containing hydraulic fluid from the master cylinder system that travel to and control the actuation system 35 and also the adjustable needle valves in the nozzles 90. One may see that this master-cylinder-actuator-nozzle-hydraulic-fluid system is preferably separate from the pump-nozzle-turbine hydraulic system, and is a control system for actuating and/or adjusting the clutch/pump system and for adjusting the variable valving for the nozzles. Thus, this control system serves to control the start of braking, the force of braking, and the duration of braking by controlling engagement of the pumps on the wheels and the workload applied to the pumps and the wheels.

Figure 3:
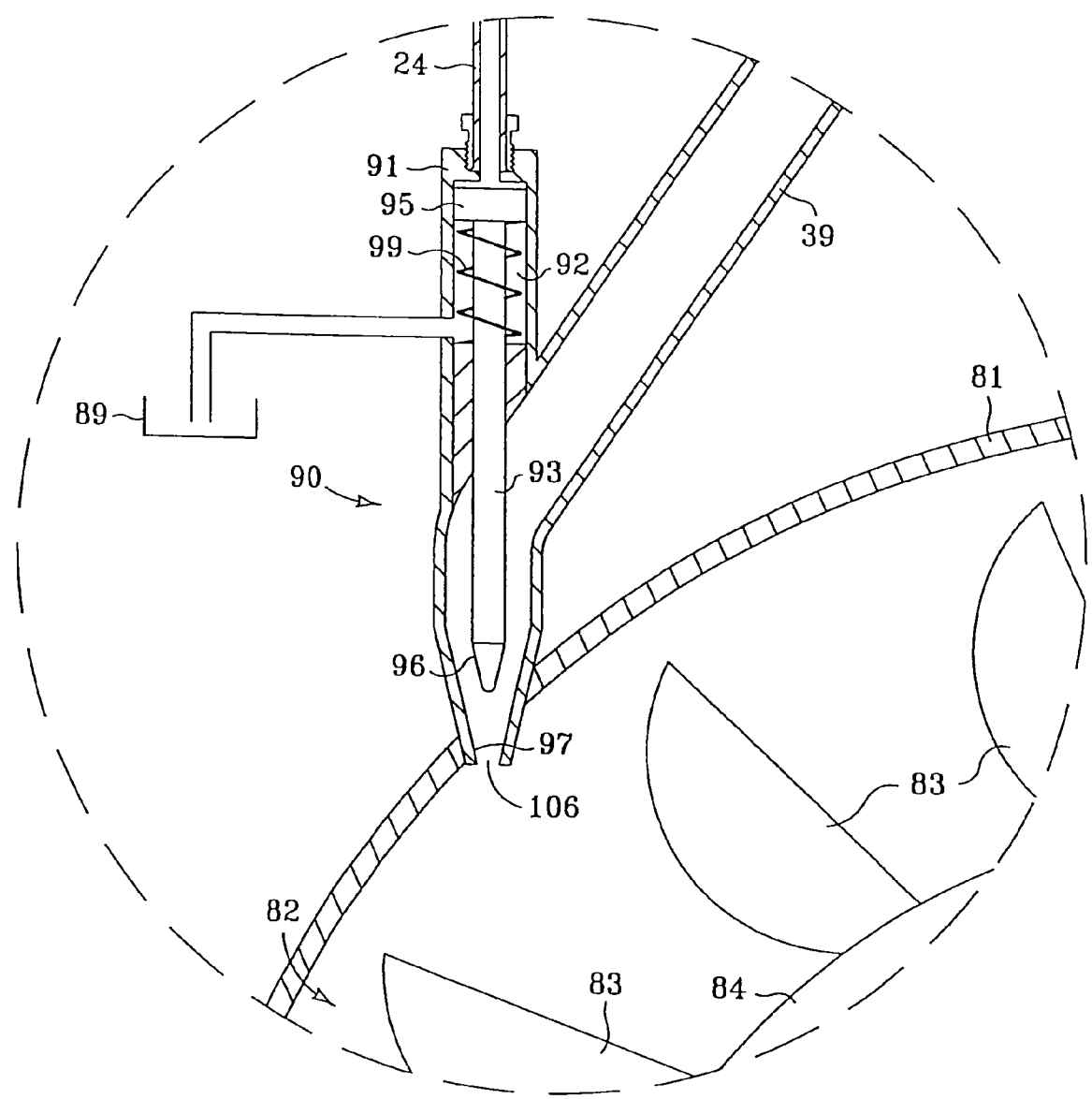
FIG. 3 is a cutaway view of one embodiment of a turbine generator and an open nozzle according to the invention.
Figure 4:
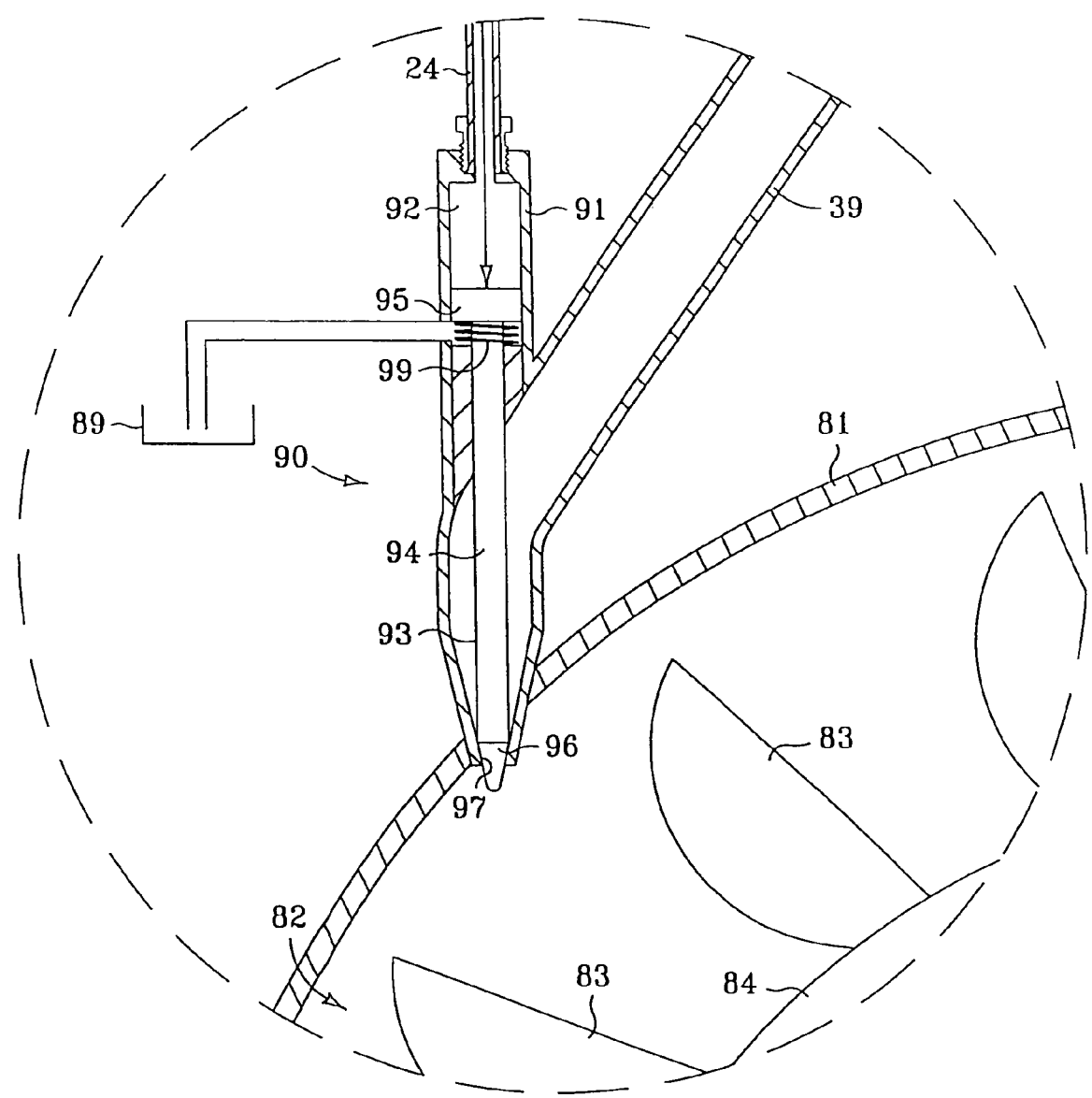
FIG. 4 is a cutaway view of the turbine generator and nozzle embodiment of FIG. 3, wherein the nozzle is closed.
Figure 5:
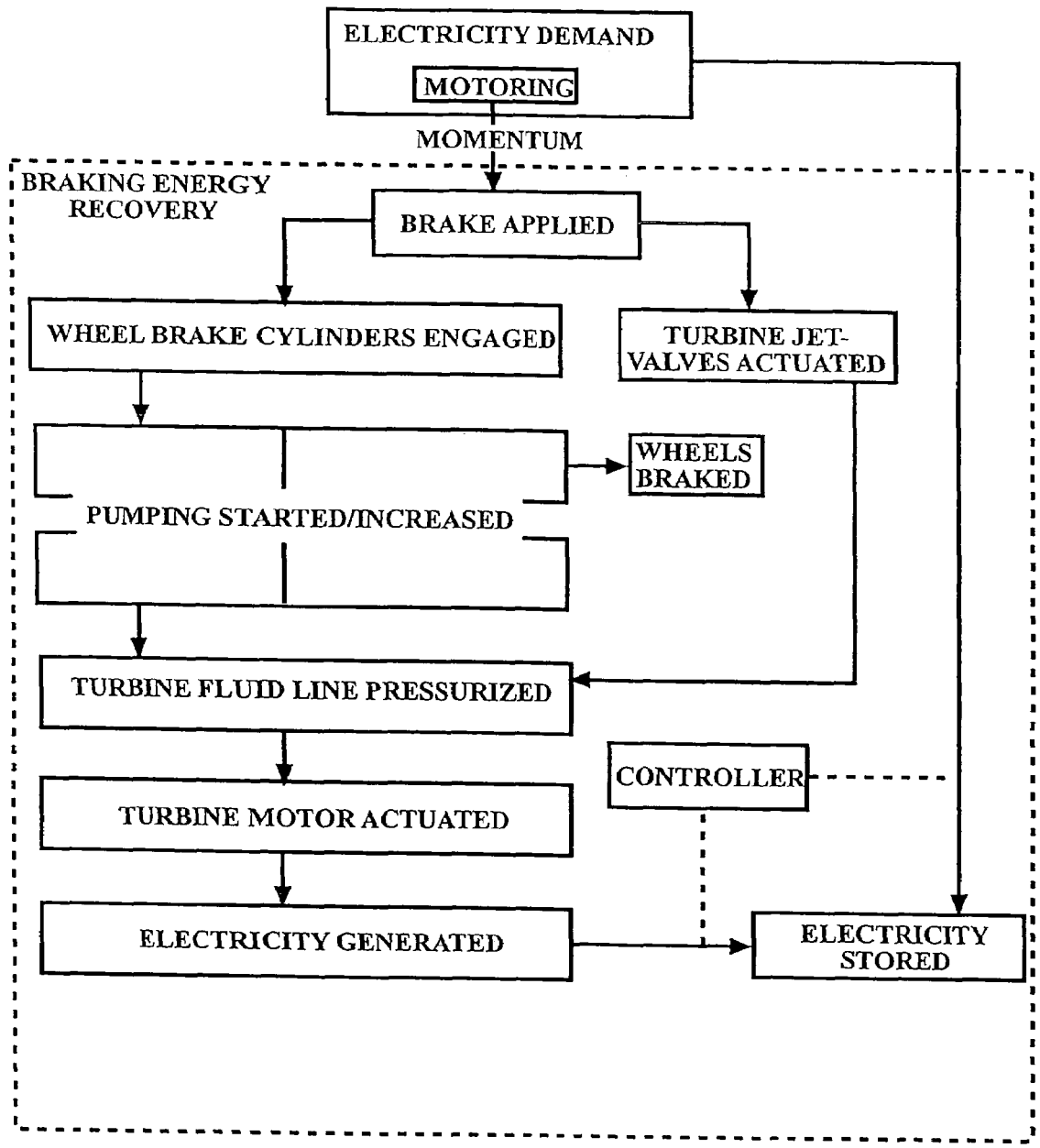
FIG. 5 is a schematic view of steps for one embodiment of the invention.

FIGS. 3 and 4 show adjustable nozzles 90 have body 91, cylinder bore 92, valve opening spring 99, and needle valve 93. The needle valve has piston end 95 and face end 96. FIG. 3 shows the needle valve in its open position and FIG. 4 shows the valve in its closed position, and therefore also suggests the variable positions and variable flowrates in between these two positions.

As shown in FIGS. 1 and 2, the braking system and vehicle of this invention may also include controller 16. This controller uses known methods and components to assure effective management of the power/energy generated and used by the vehicle. Further, additional controller(s) systems may be used to provide safeguards and controls for proper operation of the braking system. For example, the nozzle direction may be adjusted to impact the flywheel cups or blades at an optimum angle, depending on flywheel shaft rpm. Also, drag by the turbine generator may be adjusted by adjusting the fields of its cooperating magnets, for example.

In operation, braking is initiated by the actuation of brake master cylinder 22 which provides hydraulic pressure to each clutch/actuator 35 and to each nozzle 90. In clutch embodiments, this causes each clutch to engage and mechanically connect each rotating wheel 18 with its corresponding hydraulic pump 30. Actuation of the master cylinder also causes needle valves 93 to adjust their position, thus allowing the pressurized fluid output of each pump to impinge on cup blades 83 of runner 82 at appropriate rates/volumes, causing turbine flywheel 84 and generator section 14 to rotate. The rotation of the turbine generator thus produces electrical power which is transmitted to the vehicle's electrical energy storage device. This extraction of power from the hydraulic circuit initiates the braking action on each of the wheels. Further braking action is achieved by reducing the fluid flow in each pump's output circuit by a closing movement of the needle valves within the nozzle bodies as controlled by the master cylinder. This action increases the pressure in the output circuit of each pump, which increases the energy required by the pump to accomplish a given amount of pumping, which translates to a reduction of the pump's speed and further slowing of the wheels, via the clutches or other linkage to the wheels.

It is a preferred and important feature of this invention that the turbine generator continues to rotate and generate electrical power after the flow of hydraulic fluid is removed from the cup blades of the turbine. In this fashion, nearly all of the kinetic energy stored in the rotating components of the turbine generator is recovered for use by the vehicle.

Figure 6:
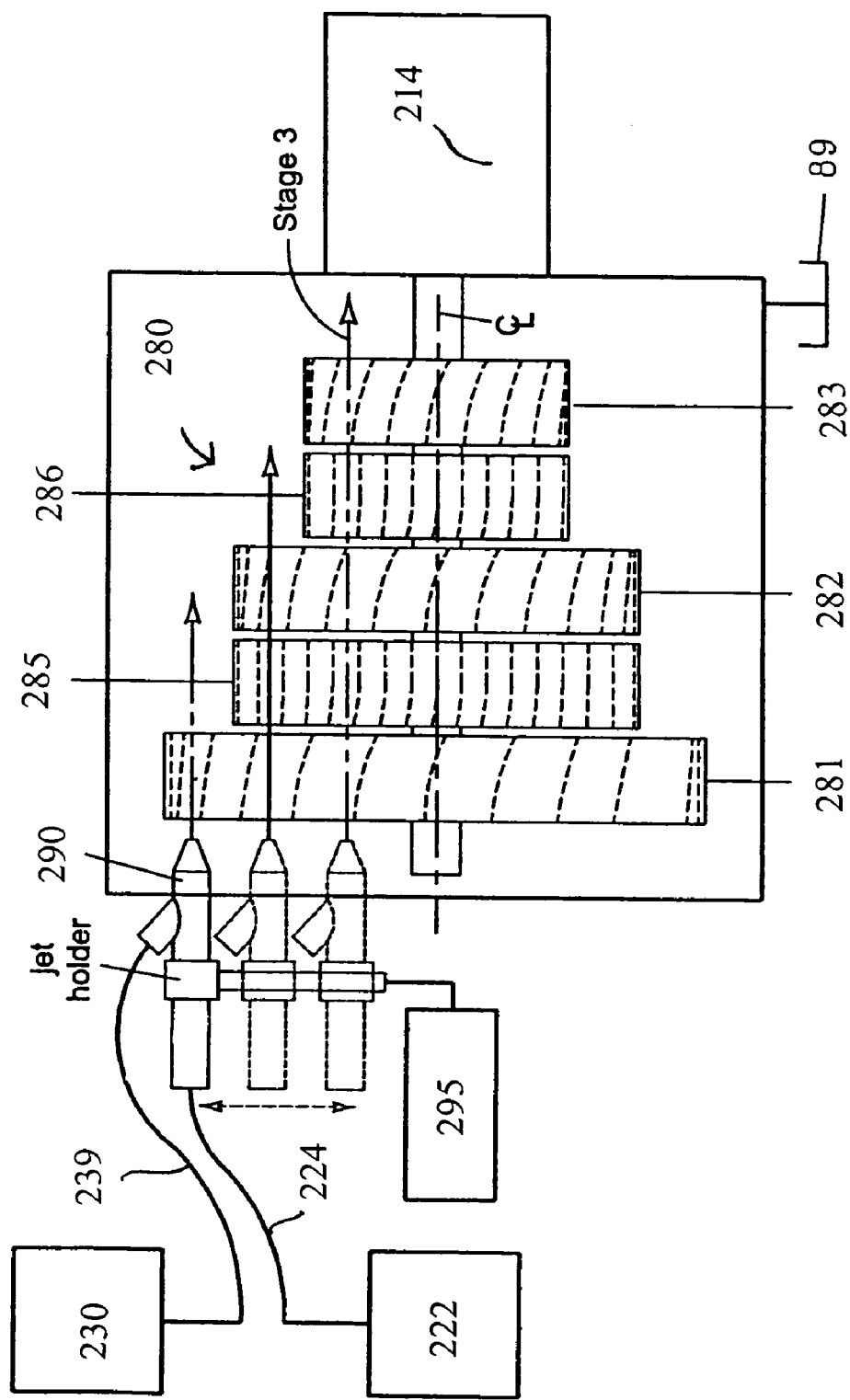
FIG. 6 is a schematic view of one embodiment of a multi-stage turbine for use in some embodiments of the turbine generator regenerative braking system.

As illustrated in FIGS. 6-15 a multi-stage turbine may be effective for energy recovery from the fluid being discharged from the jet nozzle(s). FIG. 6 illustrates one embodiment of a multi-stage turbine system, comprising three stages and adjustable jet nozzles. The inventor envisions that a multi-stage turbine having up to about 11 stages may be advantageous, or that a regenerative braking system using a turbine with fewer stags may be supplemented with other means of braking.

Figure 7:
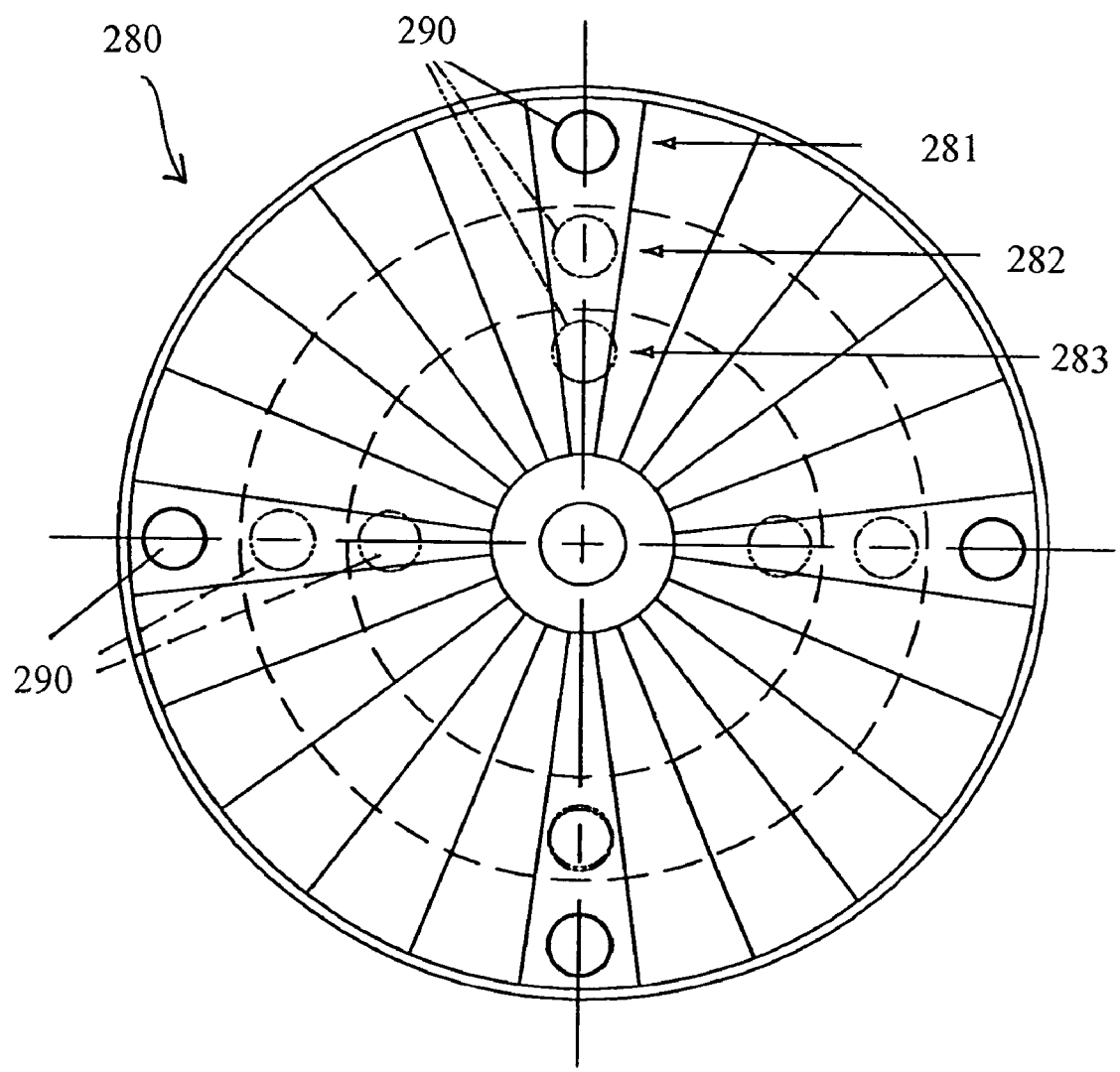
FIG. 7 is a schematic front view of the multi-stage turbine of FIG. 6, illustrating three jet nozzle positions cooperating with three stages of the turbine.

As one will note from the above description and from FIG. 7, it is expected that multiple jet nozzles will be used, for example, spaced around the perimeter of the turbine. The jet nozzles may be adjusted in direction of fluid flow and/or in location of the jet nozzle itself, in order to optimize turbine performance, and, hence, to optimize energy recovery. FIGS. 6-10 illustrate examples of jet nozzles being moved transversely to the longitude of the nozzle/needle valve, but other embodiments may optimize turbine performance by pivoting the jet nozzles or deflecting flow from the jet nozzles, instead of, or in addition to, this transverse movement.

Turbine 280 comprises a first stage 281, second stage 282, and a third stage 283, with flow laminarizers 285, 286 between stages, and connection to electrical generator 214. FIG. 6 illustrates pump 230, which is operatively connected to the rotating shaft or wheel to be slowed, and which pumps fluid through the appropriate section of hydraulic circuit 239 to discharge the fluid at the nozzle 290. A master cylinder, brake control pump, or other control system 222 supplies fluid through line 224 to adjust the needle valve restriction, as discussed above. The jet nozzle(s) 290 may be adjusted in location and/or direction by actuator 295, which, as discussed below, may be various types of systems. In FIG. 6, actuator 295 moves the jet nozzle(s) inward radially from a position of cooperation with first stage 281, to a position of cooperation with Stages 1 and 2, to a position close to the center of the turbine for cooperation with Stages 1, 2 and 3. FIG. 7 further illustrates moveable jet nozzles 290, wherein four are shown in various positions around the circumference of the turbine 280.

Figure 8:
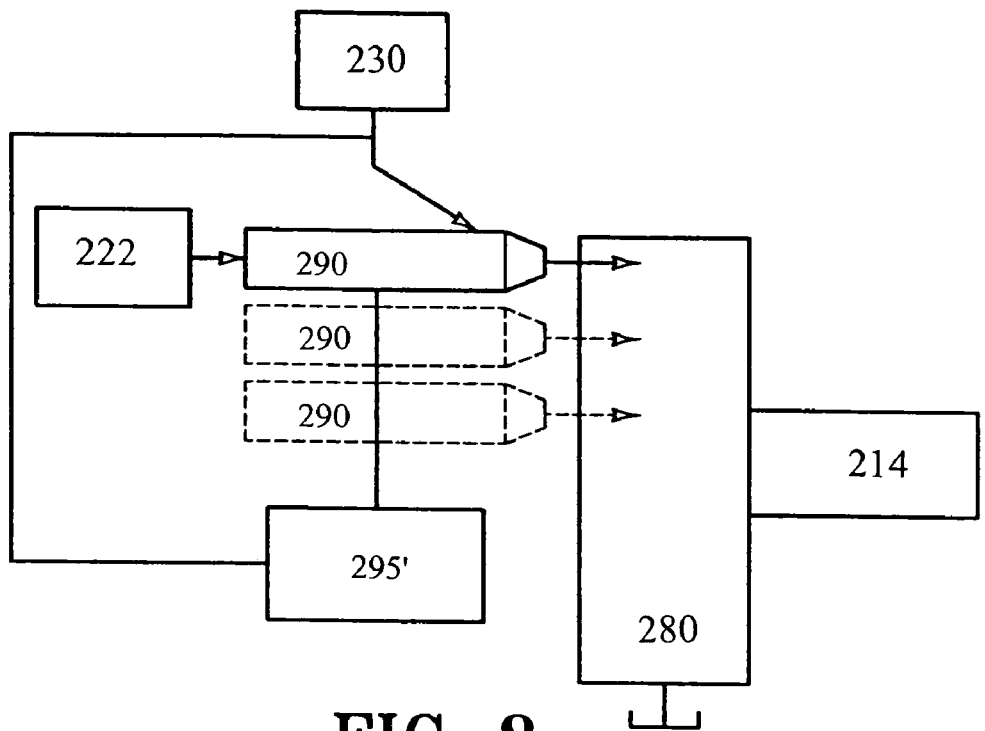
FIG. 8 is a schematic view of one embodiment of a jet nozzle/valve position control system that may be used with the turbine of FIGS. 6 and 7, wherein the wheel/axle pump pressure directly determines jet nozzle position.
Figure 9:
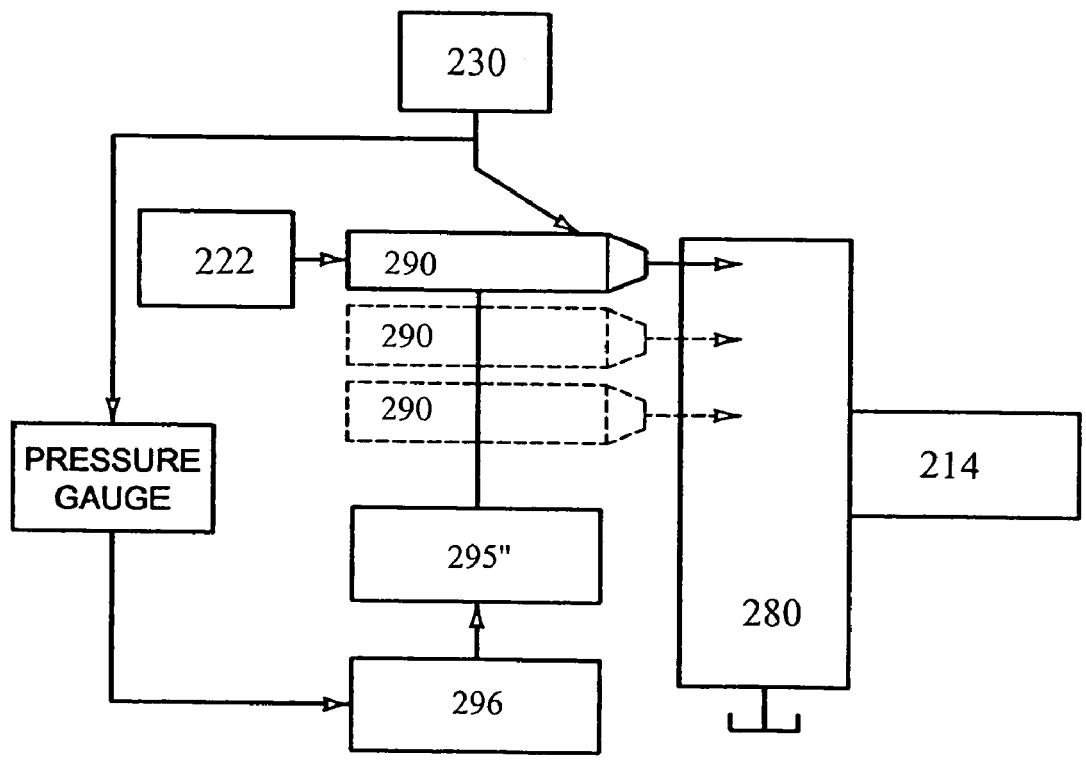
FIG. 9 is a schematic view of another embodiment of a jet nozzle/valve position control system that may be used with the turbine of FIGS. 6 and 7, wherein wheel/axle pump pressure determines jet nozzle position indirectly via a microprocessor(s) controlling an actuator.
Figure 10:
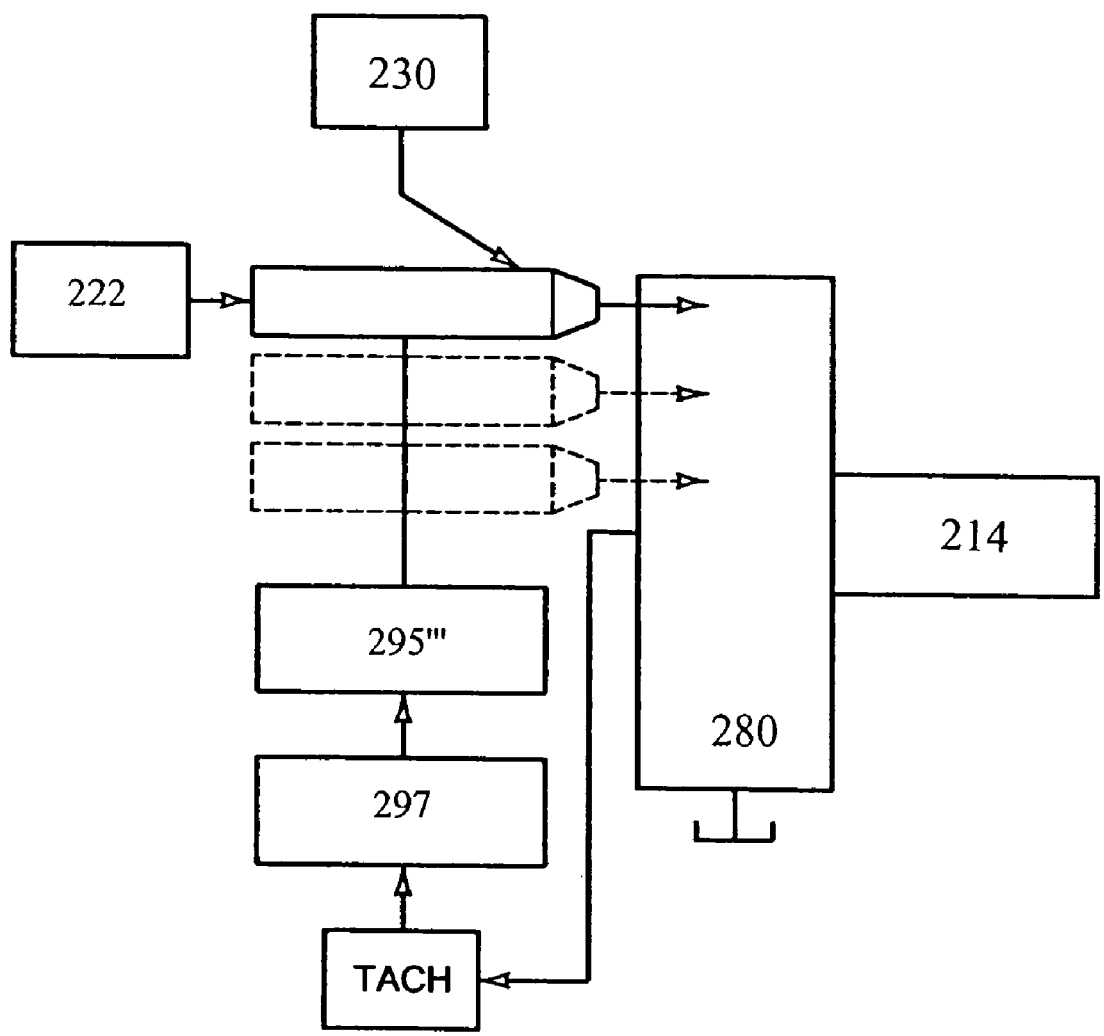
FIG. 10 is a schematic view of another embodiment of a jet nozzle/valve position control system that may be used with the turbine of FIGS. 6 and 7, wherein turbine speed determines jet nozzle position indirectly by means of a microprocessor(s) controlling an actuator.
Figure 11:
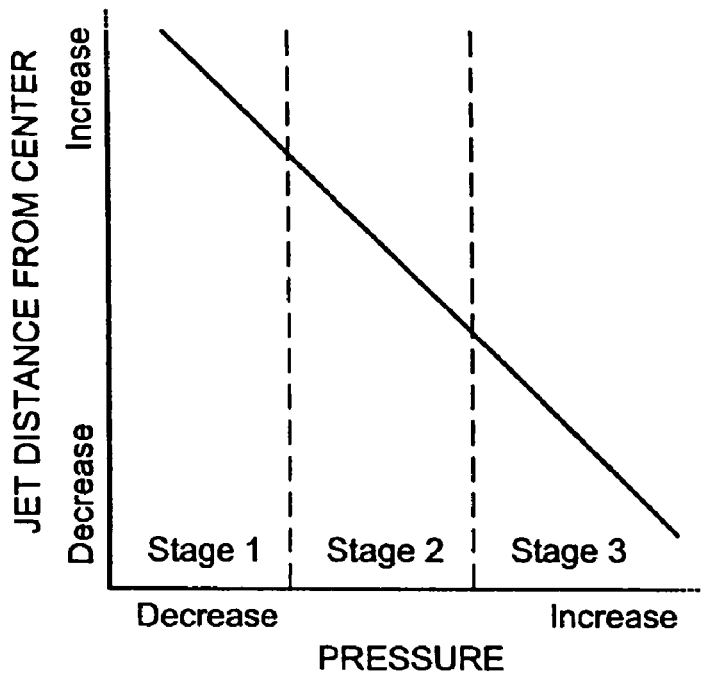
FIG. 11 is a schematic plot of jet nozzle distance from center of turbine vs. wheel/axle pump pressure.
Figure 12:
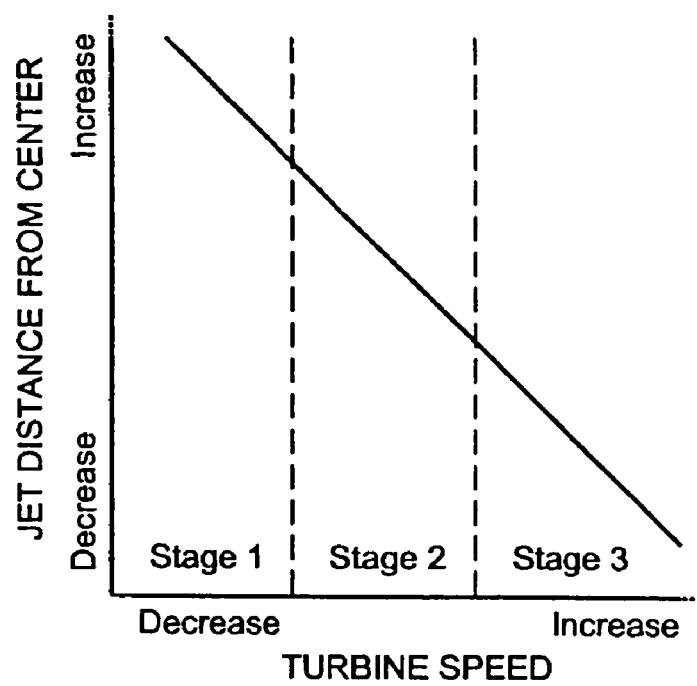
FIG. 12 is a schematic plot of jet nozzle distance from center of turbine vs. turbine speed.
Figure 13:
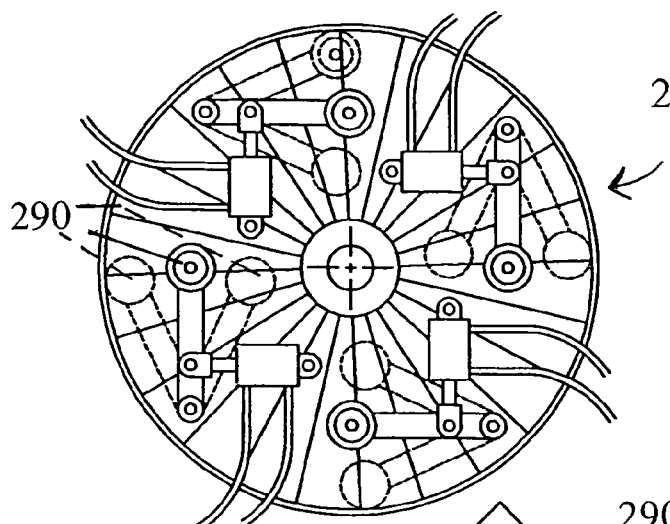
FIG. 13 is a schematic front view of a multi-stage turbine with jet nozzles adjustable in position by means of lever offset (non-linear) hydraulic cylinders.
Figure 14:
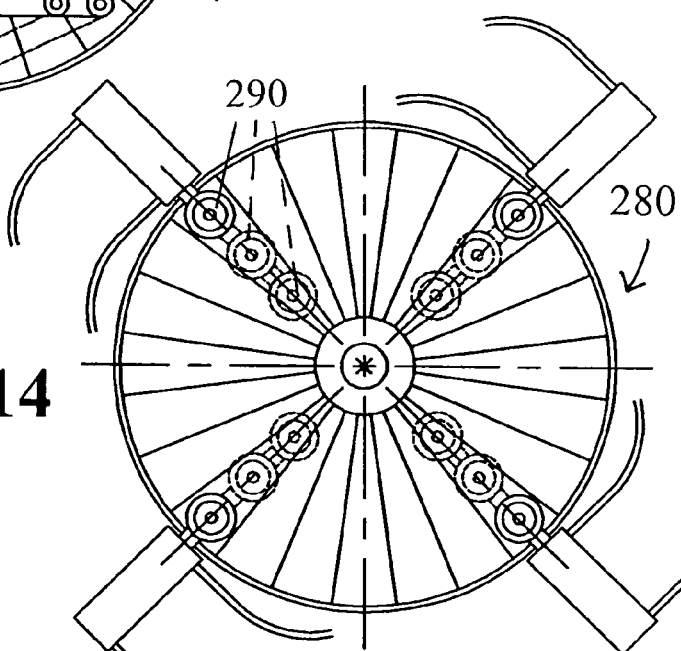
FIG. 14 is a schematic front view of a multi-stage turbine with jet nozzles adjustable in position by means of linear hydraulic cylinders.
Figure 15:
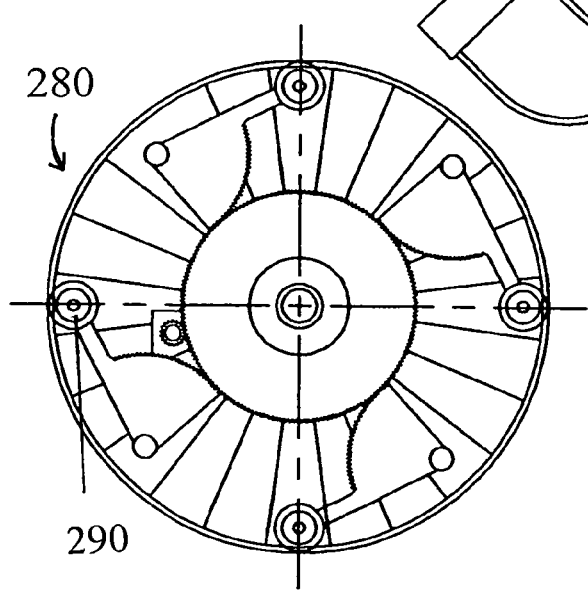
FIG. 15 is a schematic front view of a multi-stage turbine with jet nozzles adjustable in position by means of a geared stepper motor driving geared levers.

Some, but not the only, possible actuation systems for moving jet nozzles are shown in FIGS. 8-10. FIG. 8 includes direct control of the jet nozzle location by the brake master cylinder (222, which is operated by the driver of the vehicle) via hydraulic actuator 295' to move the nozzle 290. FIG. 9 illustrates an indirect system wherein a microprocessor controller 296 responds to master cylinder (222) pressure to signal an actuator 295" to move the nozzle 290. FIG. 10 illustrates an indirect system wherein a microprocessor controller 297 responds to a turbine tachometer to signal an actuator 295''' to move the nozzle 290. Example relationships between desired jet nozzle 290 position (relative to the center of the turbine 280, and, hence, relative to the stages 281, 282, 283) and the pump pressure and turbine speed, are shown in FIGS. 11 and 12, respectively.

Although this invention has been described above with reference to particular means, materials and embodiments, it is to be understood that the invention is not limited to these disclosed particulars, but extends instead to all equivalents within the scope of the following claims.

I claim:

1. A turbine generator regenerative braking system for braking a rotating shaft, said braking system comprising:
   a rotating shaft of a piece of machinery;
   at least one hydraulic fluid pump operatively connected to said rotating shaft so that said rotating shaft powers the at least one pump;
   a hydraulic fluid circuit having one end in fluid communication with the at least one hydraulic pump and a second end comprising an adjustable-outlet jet nozzle;
   an hydraulic fluid turbine generator positioned near said jet nozzle and having an electrical power output;
   wherein the at least one hydraulic fluid pump supplies hydraulic fluid to the jet nozzle so that the jet nozzle sprays hydraulic fluid on a turbine portion of the turbine generator to generate electricity;
   wherein said turbine portion comprises multiple stages and said jet nozzle is moveable to spray different of said multiple stages; and
   wherein said rotating shaft is slowed by powering said at least one pump.

2. A turbine generator regenerative braking system according to claim 1 wherein said rotating shaft is a combustion engine shaft.

3. A turbine generator regenerative braking system according to claim 1 wherein said rotating shaft is a combustion engine vehicle shaft.

4. A turbine generator regenerative braking system according to claim 1 wherein said rotating shaft is a combustion engine vehicle axle.

5. A turbine generator regenerative braking system according to claim 1 wherein said jet nozzle is a needle valve.

6. A turbine generator regenerative braking system according to claim 5 wherein said needle valve is an adjustable-direction needle valve.

7. A turbine generator regenerative braking system according to claim 1 wherein said at least one pump is a positive displacement pump.

8. A turbine generator regenerative braking system according to claim 7 wherein said positive displacement pump is a fixed displacement pump.

9. A turbine generator regenerative braking system according to claim 7 wherein said positive displacement pump is a variable displacement pump.

10. A method of regeneratively braking a rotating shaft, the method comprising:
    providing a hydraulic fluid circuit comprising a hydraulic pump at one end and an adjustable-outlet jet nozzle at a second end;
    providing a hydraulic fluid turbine generator having a turbine portion with multiple stages and a center, and positioning said turbine portion near said jet nozzle and connecting an electrical power output of said turbine generator to a battery device;
    mechanically linking said hydraulic pump to a rotating shaft of a piece of machinery so that said hydraulic fluid pump is actuated to pump hydraulic fluid to the jet nozzle to spray hydraulic fluid on the turbine portion to rotate the turbine portion and generate electricity;

moving said jet nozzle to change location relative to the center of the turbine portion and spraying different of said multiple stages; and wherein said rotating shaft is slowed by the work load of said pumping of the hydraulic fluid.

11. A method as in claim 10, wherein said jet nozzle has a longitudinal axis, and said moving the jet nozzle comprises moving the jet nozzle transversely to the longitudinal axis.

12. A method as in claim 11, wherein said jet nozzle is a needle valve.

13. A method according to claim 12, further comprising closing said jet nozzle to stop flow of said hydraulic fluid and stop rotation of said rotating shaft.

14. A method as in claim 10, wherein said moving the jet nozzle comprises pivoting the jet nozzle.

15. A method as in claim 14, wherein said jet nozzle is a needle valve.

16. A method according to claim 15, further comprising closing said jet nozzle to stop flow of said hydraulic fluid and stop rotation of said rotating shaft.

17. A method according to claim 10, wherein said rotating shaft is a combustion engine shaft.

18. A method according to claim 10, wherein said rotating shaft is a combustion engine vehicle shaft.

19. A method according to claim 10, wherein said rotating shaft is a combustion engine vehicle axle.

* * * * *